United States Patent
Sundelin

[11] Patent Number: 6,091,869
[45] Date of Patent: Jul. 18, 2000

[54] LOW LOSS, OPTICAL ADD/DROP WDM NODE

[75] Inventor: Magnus Sundelin, Stockholm, Sweden

[73] Assignee: Telefonaktiebolaget LM Ericsson, Stockholm, Sweden

[21] Appl. No.: 09/429,487

[22] Filed: Oct. 29, 1999

Related U.S. Application Data

[63] Continuation of application No. PCT/SE98/00801, Apr. 30, 1998.

[51] Int. Cl.[7] ............................... G02B 6/28; H04J 14/00
[52] U.S. Cl. ............................... 385/24; 385/31; 385/39; 385/42; 359/115; 359/124; 359/127
[58] Field of Search ............................... 385/24, 31, 39, 385/42; 359/115, 124, 127

[56] References Cited

U.S. PATENT DOCUMENTS

| | | | |
|---|---|---|---|
| 5,488,500 | 1/1996 | Glance | 359/127 |
| 5,493,625 | 2/1996 | Glance | 385/24 |
| 5,504,609 | 4/1996 | Alexander et al. | 359/125 |
| 5,600,473 | 2/1997 | Huber | 359/179 |
| 5,751,456 | 5/1998 | Koonen | 359/127 |
| 5,822,095 | 10/1998 | Taga et al. | 359/127 |
| 5,859,941 | 1/1999 | Horita et al. | 385/24 X |
| 5,915,051 | 6/1999 | Damask et al. | 385/16 |
| 5,920,413 | 7/1999 | Miyakawa et al. | 359/130 |
| 5,940,556 | 8/1999 | Moslehi et al. | 385/28 |
| 5,959,749 | 9/1999 | Danagher et al. | 359/124 |
| 5,974,207 | 10/1999 | Aksyuk et al. | 385/24 |
| 5,982,518 | 11/1999 | Mizrahi | 359/130 |
| 6,002,503 | 12/1999 | Mizrah | 359/124 |
| 6,023,543 | 2/2000 | Perrier et al. | 385/24 |

FOREIGN PATENT DOCUMENTS

| | | | |
|---|---|---|---|
| 0 242 802 A2 | 10/1987 | European Pat. Off. | 385/24 X |
| 0 332 197 A2 | 9/1989 | European Pat. Off. | 385/24 X |
| 0 668 674 A2 | 8/1995 | European Pat. Off. | 385/24 X |
| 0 695 050 A1 | 1/1996 | European Pat. Off. | 385/24 X |
| 97/06616 | 2/1997 | WIPO | 385/24 X |

*Primary Examiner*—Brian Healy
*Attorney, Agent, or Firm*—Nixon & Vanderhye, P.C.

[57] ABSTRACT

An add/drop (7) node for an optical fiber network of WDM type has preamplifiers (19, 21) connected to the input fibers (3, 11). Part of the incoming signal power is tapped off by means of drop couplers or splitters (47, 49) and the tapped-off power is provided to a demultiplexer (51) where WDM information channels to be extracted from the network in the node are separated from each other and then fed to opto-electrical receivers (15). WDM information channels to be added in the node from electro-optical transmitters (17) are first combined in a multiplexer (61), the resulting signal being provided to add couplers (57, 59) to which also the signals incoming to the node are provided so that a combined signal is obtained for transmission to the opposite side of the node (7). Channels are thus added in the node to channels passing substantially ininterrupedly through the node. In order to have a low attenuation of the passing signals, the power per channel in the added signal is given approximately the same level as the power of each passing channel by an optical amplifier (65, 67) arranged in the input line to the add coupler from the multiplexer (61). By this arrangement it is possible to maintain a low attenuation of the passing signals within the optical add/drop node, since no extra attenuating devices are needed for the light signal containing the passing channels. The signal to noise ratio of these channels can thus be kept high.

2 Claims, 2 Drawing Sheets

LOW LOSS, OPTICAL ADD/DROP WDM NODE

This application is a continuation of PCT/SE98/00801 filed Apr. 30, 1998 pending.

TECHNICAL FIELD

The invention relates to an optical add/drop node for adding and dropping wavelength division multiplexed (WDM) traffic channels.

BACKGROUND AND PRIOR ART

Multi-channel WDM systems are used in order to enhance the transmission capability of optical fiber networks, so that channels which previously would have to be transmitted on a plurality of separate fiber pairs now can be forwarded on a single fiber pair. Using optical wavelength division multiplexed channels means that a plurality of serial information signals, i.e. a plurality of serial binary signals, are transmitted on the same optical fiber by modulating such a serial signal on a light signal having a definite wavelength and then combining the modulated light signals in an optical coupler or optical multiplexer to a composite light signal on the considered optical fiber. The signal primarily modulated on a monochromatic carrier light signal together with the carrier can be called a channel or traffic channel.

Optical wavelength multiplexing can be used to construct different optical fiber network solutions, e.g. solutions using point to point links, networks using a "full mesh bus" or a hubbed bus, etc. All bus solutions require the possibility to add and drop one or more wavelength channels, see FIG. 1, at selected places of the fiber optical network, these places being called add/drop nodes. For the fiber optical WDM network of FIG. 1 having two add/drop nodes, a left line cable 1 comprising two optical fibers 3, 5 for transmission of light signals in the two opposite directions are coupled to one side of such an optical add/drop node 7, the other side of the node 7 being connected to the two fibers 9, 11 of a right line cable 13. The node 7 is connected to or contains receivers 15 and transmitters 17 for converting optical signals to electrical signals and vice versa, the electrical signals being transferred or received respectively from other devices, links or networks, not shown. The line cables 1, 13 ending at a node 7 have their other ends connected to other, for example identically constructed nodes 7. The add and drop operation of such a node can be executed using blocking or non-blocking drop operation. A blocking drop operation means that all the information of the dropped optical wavelength is filtered out and blocked in the add/drop node. A non-blocking drop operation means that only a portion of the power of the dropped optical wavelength is filtered out. The rest of the signal power of the considered wavelength proceeds through the network, through the node and on to the line cable connected to the opposite side of the node.

One important requirement of such an optical add/drop node is that the node should add as little noise as possible, e.g. noise produced by amplified spontaneous emission (ASE) in fiber optical amplifiers usually included in the node, and that the node should have a flat frequency transfer function for light transferred from one side to the opposite side thereof and a balance between the power of added and passing wavelength channels on an optical output line of the node, i.e. the optical output power should be at least approximately the same for every wavelength channel.

One prior art design of an add/drop node having a blocking drop operation is shown in FIG. 2. The optical WDM traffic enters the node through an optional optical preamplifier 19, 21. Each wavelength is filtered out in a demultiplexing element DEMUX 23, 25 separating the channels so that on each of the plurality of output fibers of the demultiplexer 23, 25 only one channel is transmitted, i.e. information carried by light within a single wavelength interval. Dropped channels are fed to receivers 15 through optical fibers 27, 29, each such fiber extending from a demultiplexer 23, 25 to a combining coupler 30 connected to the input terminal of a receiver for the dropped wavelength. Channels to be added as well as passing channels are fed to a multiplexing element MUX 31, 33. Its corresponding input terminals are connected through optical fibers 35, 37, each such fiber extending to a multiplexer 31, 33 from a splitting coupler 38, which is connected to the output terminal of a transmitter 17 for the wavelength to be added. The other input terminals of a multiplexer 31, 33 are connected through optical fibers 39, 41 to respective output terminals of the respective demultiplexer 23, 25 for the same transmission direction through the node. The WDM traffic at the output of the MUX 31, 33 is fed to an optional optical power or booster amplifier 43, 45 and therefrom to the respective fiber of the opposite line cable 1, 13.

The drawback of the solution illustrated in FIG. 2 is that it implies a relatively large number of cascaded filters, i.e. the in-line demultiplexers 23, 25 and in-line multiplexers 31, 33, if a large number of add/drop nodes 7 exist in the network. An additional drawback is that a non-blocking drop operation can not be implemented.

In the published International patent application WO 97/06616 an optical wavelength division multiplexing system including branching units is disclosed. A branching unit comprises typically two circulators and a Bragg grating filter connected therebetween. In the optical fiber line carrying the signal to be added an optical amplifier is connected amplifying the signal to be added to a suitable power level controlled in accordance with the power level of a dropped signal. In the published European patent application 0,668, 674 a wavelength division multiplexed network system is disclosed having a plurality of nodes connected to form a ring configuration of the self-healing type. The nodes can include couplers, amplifiers and demultiplexers/multiplexers.

SUMMARY

It is an object of the invention to provide an add/drop node for a fiber optical network, that has a small splitting loss for traffic channels passing through the node.

The problem to be solved by the invention is thus to provide a WDM network comprising an add/drop node, the node only little attenuating the power of WDM channels passing through the node and the attenuation being substantially only that which results from the power reduction needed for tapping off a sufficient signal power in order to extract those WDM channels which are terminated in the node.

In constructing such an add/drop node, which is the type having an add coupler for adding those channels which are added in the node to those passing substantially uninterruptedly through the node, the basic idea has been that in order to have a low attenuation of the passing signals, the power per channel in the added signal must have approximately the same level as the power of each passing channel, at the entrance of the add coupler. This is achieved by providing an extra optical amplifier in the input line to the add coupler, on which the light signal carrying the added channels are fed to the add coupler. The light signal comprising the added channels are generally produced by electro-optical transmitters and a optical wavelength multiplexer and then the additional optical amplifier is provided on the output of the multiplexer. By this arrangement it is possible to maintain a low attenuation of the passing signals within the optical add/drop node, since no extra attenuating devices are needed for the light signal containing the passing channels. Thereby the signal to noise ratio of these channels can be kept high.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
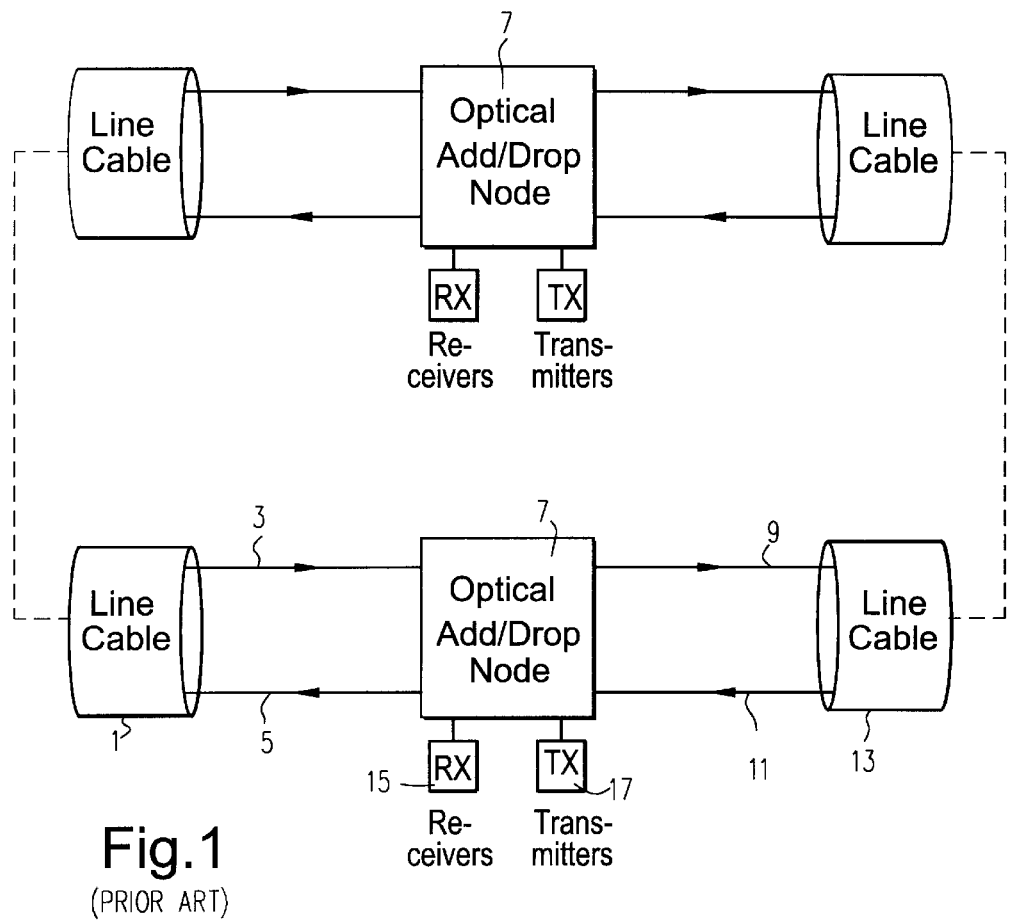
FIG. 1 is a general schematic view of a simple optical fiber network of WDM type having prior art add/drop nodes.
Figure 3:
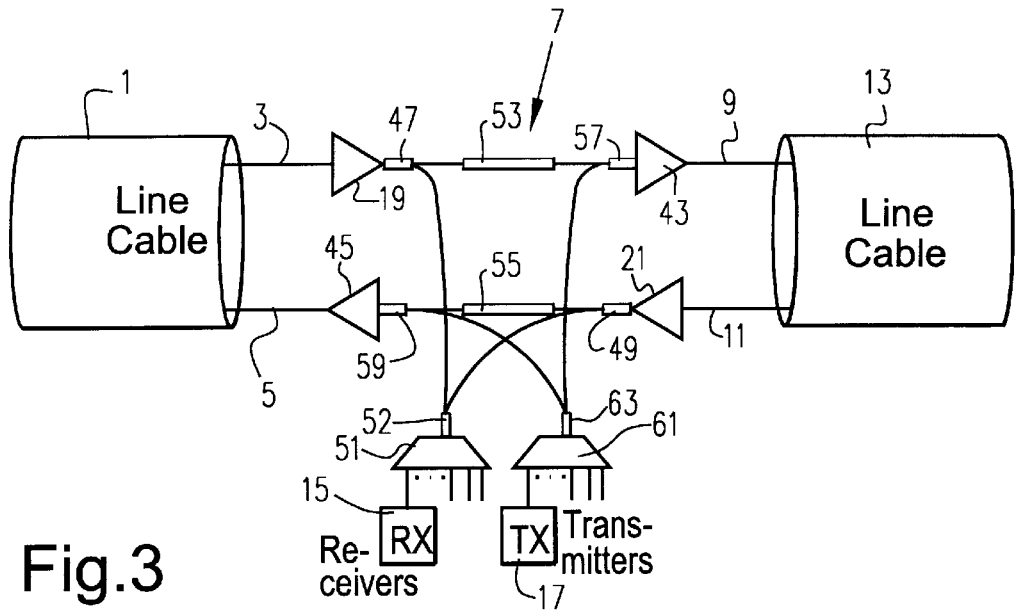
FIG. 3 is a block diagram of an add/drop node for an optical WDM network allowing both blocking drop and non-blocking drop operations.

The construction of an add/drop node which can be used in optical WDM networks, example the simple network illustrated in FIG. 1, and which can be configured for either a blocking drop operation or a non-blocking drop operation is illustrated by the block diagram of FIG. 3. WDM traffic arrives to a node 7 from two opposite directions. The node 7 is at a left side connected to a left line cable 1 comprising two optical fibers 3, 5 for transmission of light signals in the two opposite directions whereas the other, right side of the node 7 is connected to two optical fibers 9, 11 of a right line cable 13. The node 7 is connected to or contains receivers 15 and transmitters 17 for converting optical signals to electrical signals and vice versa respectively, the electrical signals being transferred or received respectively from other devices, links or networks, not shown. The line cables 1, 13 ending at a node 7 can have their other ends connected to other, for example identically constructed nodes. The traffic incoming to the node from one direction is amplified in an optical preamplifier 19, 21 and is then split in a drop coupler 47, 49. This coupler is an optical power splitter that feeds a portion of the total signal power of the WDM traffic to an optical demultiplexer 51, which through a combining coupler 52 receives the tapped-off light signals from both directions and filters out each channel, some channels of which are then forwarded to opto-electrical receivers 15.

The remaining portion of the total signal power of the WDM traffic passing through the node as split by the splitter 47, 49 is fed to wavelength blocking filters 53, 55, is mixed in an add coupler 57, 59 with the new traffic to be transmitted from the considered node 7 and then fed to an optical power amplifier 43, 45 which on their output terminals provide the signals going out from the node to the respective optical fiber 9, 5 of the line cables 13, 1. By arranging/not arranging the blocking filters 53, 55 the node can be made to work in a blocking drop or non-blocking drop operational mode. The new traffic to be added in the considered node 7 is obtained from electro-optical transmitters 17, each transmitting signals of a definite wavelength band, through an optical multiplexer 61 and a splitting optical coupler 63, which is connected to the output terminal of the multiplexer 61 and has its two output terminals connected to an input terminal of the add couplers 57, 59.

A drawback of the node according to FIG. 3 is that is adds a lot of noise to the passing light signals. The reason therefor is that the optical output power per channel from the multiplexer 61 is very low compared to the output power of the optical preamplifier 19, 21, and hence the attenuation in the drop couplers 47, 49 and the add couplers 53, 55 has to be high for the passing signals in order to keep them at the same power level as that of the added channels after the respective add coupler 57, 59.

Figure 2:
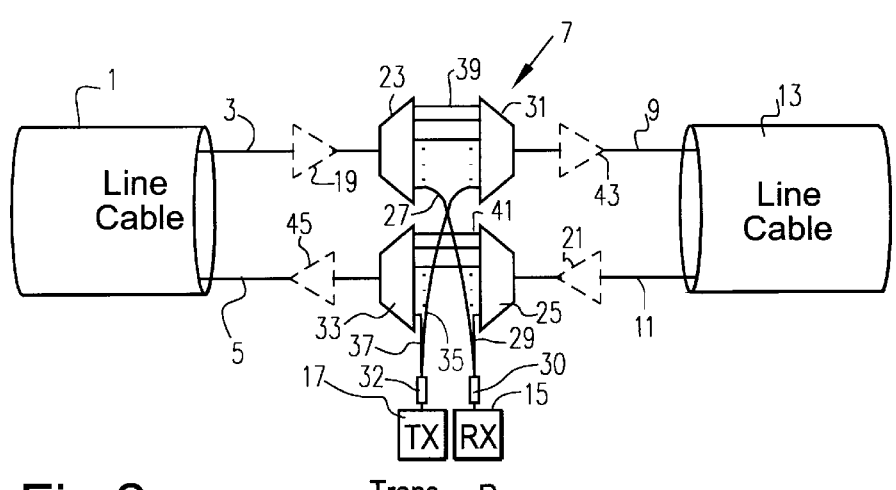
FIG. 2 is a block diagram of a prior art add/drop node for a an optical WDM network allowing only a blocking drop operation.
Figure 4:
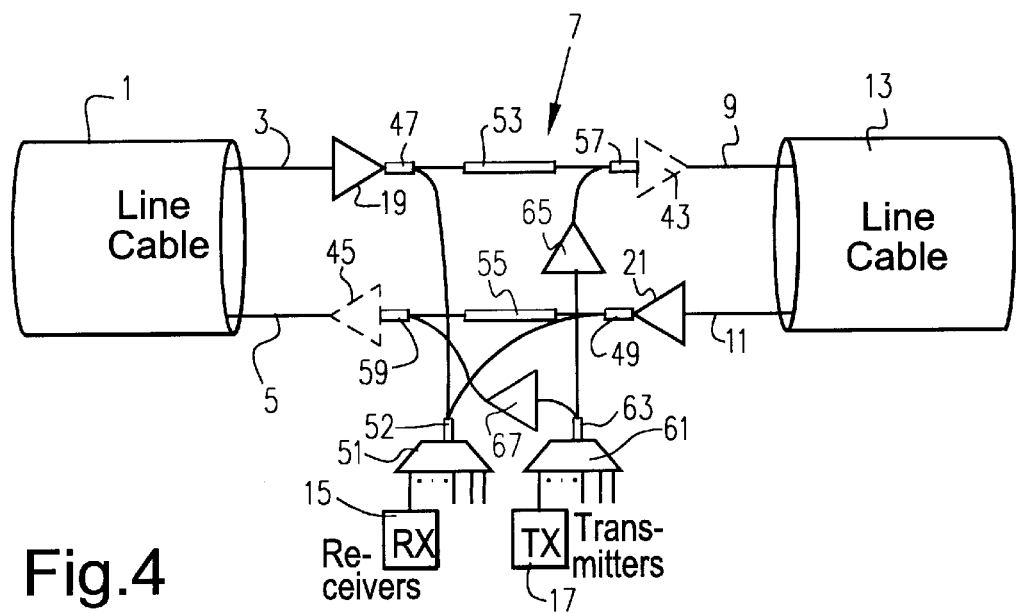
FIG. 4 is a block diagram of an add/drop node for a an optical WDM network having a better signal-to-noise for signals passing through the node than the nodes illustrated in FIGS. 2 and 3.

Another construction of an add/drop node to be used in fiber optical networks using wavelength division multiplexing, for example also of the basic type illustrated in FIG. 1, and having a high signal-to-noise-ratio compared to the node illustrated for example in FIG. 3 is illustrated by the block diagram of FIG. 4. The optical add/drop node 7 can thus add and drop wavelength division multiplexed traffic channels. Here, the optical power amplifier 43, 45 of the node construction according to FIG. 3 is replaced by a two stage configuration, including an optional second state. The node of FIG. 4 can be configured for either a blocking drop operation or a non-blocking drop mode of operation. Like the node depicted in FIGS. 2 and 3 a left line cable 1 comprising two optical fibers 3, 5 for transmission of light signals in both directions are coupled to one side of the optical add/drop node 7, the other side of the node 7 being connected to the two fibers 9, 11 of a right line cable 13. The node 7 comprises or is connected to receivers 15 and transmitters 17 for converting optical signals to electrical signals and vice versa, the electrical signals being transferred or received respectively from other devices, links or networks, not shown.

In the same way as for the node of FIG. 3, the optical WDM traffic enters the node from both sides thereof on the input lines 3, 11 and is amplified in optical preamplifiers 19, 21. The WDM traffic on each line is then split in drop couplers 47, 49 connected to the output terminal of the preamplifiers. Such a drop coupler is an optical power splitter that feeds a part of the total amplified signal power of the WDM traffic to an optical demultiplexer 51. In the case where the network is suitably constructed so that never the same channel arrives from both sides of the node only one demultiplexers 51 can be used having an optical combining coupler 52 on its inputs side. Each wavelength interval is filtered out in the demultiplexing element 51 which thus separates the optical channels so that on each of the plurality of output fibers of the demultiplexer 51 only one channel is transmitted, i.e. information carried by light within a single wavelength interval. Some channels of the WDM traffic are then forwarded to opto-electrical receivers 15.

The other part of the split total signal incoming on one side of the node 7 can then be fed to optional wavelength blocking filters 53, 55, which are arranged to block light of those wavelength intervals which from the demultiplexer 51 are transmitted to the receivers 15. By arranging/not arranging the blocking filters 53, 55 the node is made to work in a blocking drop or non-blocking drop operational mode.

The other part is, thus either directly or through the filter 53, 55, forwarded to one input of an add coupler 57, 59. In the add coupler 57, 59 it is mixed with the new traffic channels to be transmitted originating from the considered node. These optical channel to be added are created in electro-optical transmitter 17 and are made to one light signal in a multiplexer 61 connected to the outputs of the transmitters 17. The composite signal thus obtained is split into equal shares in a splitting coupler 3 connected to the output terminal of the multiplexer 53 and amplified to a suitable power level in an optical amplifier 65, 67. The power level is adapted, so that the individual power levels of the channels to be added are as equal as possible to those of the channels continuing substantially uninterruptedly through the node 7 from one line cable 1, 13 to the opposite one 13, 1. The amplified signal output from the amplifiers 65, 67 is provided to the other input terminal of the add coupler 57, 59 and thus the new traffic channels are added to or combined with those proceeding through the node. The resulting light signal is then fed to the input end of the respective optical fiber 9, 5 of the line cable 13, 1 on the opposite side of the node. In the case where the power level of the signal output from the add coupler is not sufficient for obtaining a satisfactory information transfer, owing to a large attenuation in the fiber section, to which the light signal is transmitted, the light signal resulting from the add coupler 57, 59 is amplified in an optical power or booster amplifier 43, 45, which thus is optional. From the output terminal of the power amplifier 43, 45 the amplified light signal is in that case fed to the input end of the optical fiber 9, 5 of the line cable 13, 1 on the opposite side of the node 7.

While specific embodiments of the invention have been illustrated and described herein, it is realized that numerous additional advantages, modifications and changes will readily occur to those skilled in the art. Therefore, the invention in its broader aspects is not limited to the specific details, representative, devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An add/drop node for an optical fiber network, the node being adapted to be connected to two first optical fibers carrying each an incoming WDM light signal which propagate in opposite direction and each comprises a plurality of WDM information channels incoming to the node and to two corresponding second outgoing optical fibers each carrying an outgoing WDM light signal which propagate in opposite directions, pairs being formed of one second fiber and one first fiber, the fibers of a pair carrying light signals having the same directions, and each outgoing WDM light signal comprising a plurality of WDM information channels going out from the node, an optical preamplifier for each pair connected to an output end of the first optical fiber of the pair for amplifying the incoming WDM light signal carried by the first optical fiber of the pair, a drop coupler for each pair having an input terminal connected to an output terminal of the optical preamplifier arrange for the pair and two output terminals for splitting the light signal incoming to the drop coupler in a first portion on one output terminal and a second portion on another output terminal, an add coupler for each pair having two input terminals, one of the input terminals being connected to an output terminal of the drop coupler arranged for the pair, the add coupler having an output terminal connected to the second optical fiber of the pair, a single combining coupler having two input terminals, a first input terminal being connected to an output terminal of the drop coupler of a first pair for receiving the second portion therefrom and a second input terminal being connected to an output terminal of the drop coupler of a second pair different from the first pair for receiving the second portion therefrom, a single demultiplexer having an input terminal connected to an output terminal of the combining coupler in order to receive the combined second portions therefrom and to filter, for separating WDM information channels of the incoming light signals from each other to transmit them on separate output terminals of the demultiplexer, a single multiplexer having an output terminal and receiving WDM information channels for combining them on the output terminal, a single splitting coupler having an input terminal connected to the output terminal of the multiplexer for splitting light received from the multiplexer into two substantially equal portions delivered on two output terminals of the splitting coupler, a first output terminal being connected to an input terminal of the add coupler arranged for the first pair and a second output terminal being connected to an input terminal of the add coupler arranged for the second pair, so that in the add coupler of a pair at least one information channel of the light signal incoming on the first fiber of the pair, this at least one information channel passing in a substantially uninterrupted way through the node, and at lease one information channel added in the node are combined to a light signal to be transferred to the second optical fiber of the pair, characterized by amplifying means for amplifying the light signal appearing at an input of the add coupler and carrying the at least one other information channel to be combined, so that the power levels of each such other information channel on this input are substantially equal to the power levels of each of the at least one information channels passing through the node also at an input of the add coupler, and a blocking filter for each pair connected between an output end of the first optical fiber of a pair and an input of the add coupler arranged for the pair for blocking selected WDM information channels from passing through the node.

2. An add/drop node according to claim 1, characterized by a power amplifier for each pair, a power amplifier arranged for a pair being connected to an output of the add coupler arranged for the pair for amplifying the power of the light signal to be transmitted to the second optical fiber of the pair.

\* \* \* \* \*